United States Patent
Kantorski et al.

[15] 3,670,263
[45] June 13, 1972

[54] LASER STRUCTURE
[72] Inventors: Joseph W. Kantorski, Southbridge, Mass.; David A. La Marre; Donald A. Smith, both of Woodstock, Conn.
[73] Assignee: American Optical Corporation, Southbridge, Mass.
[22] Filed: June 16, 1969
[21] Appl. No.: 833,330

[52] U.S. Cl. ..........................331/94.5, 350/151, 74/89.15, 350/304, 350/210, 350/288
[51] Int. Cl. ......................................H01s 3/02, H01j 19/58
[58] Field of Search ..............331/94.5; 350/150, 160, 310, 350/288, 304; 74/89.15

[56] References Cited

UNITED STATES PATENTS

| 3,311,845 | 3/1967 | Koester | 331/94.5 |
| 3,427,611 | 2/1969 | Enenstein | 331/94.5 X |
| 3,430,159 | 2/1969 | Roeber | 331/94.5 |
| 3,233,028 | 2/1966 | Toppari et al. | 264/272 |
| 3,351,870 | 11/1967 | Goldsmith et al. | 331/94.5 |
| 3,400,597 | 9/1968 | Nater | 74/89.15 |
| 3,533,700 | 10/1970 | Alexander | 331/94.5 X |

FOREIGN PATENTS OR APPLICATIONS

| 1,028,643 | 5/1966 | Great Britain | 331/94.5 |

OTHER PUBLICATIONS

Hirschmann, " Electro–Optic Light Modulators," NASA Tech NATO TN D- 3687, Nov. 1966, pp. 1- 9.

349, 350. et al., " Optical Coupling of . . . . " Nuclear Instrum. & Methods, 50, 1967, pp. 349,50.

Lawrence, " Survey of Carbon Dioxide Laser Development for Space Applications," pp. 38- 43. Sept. 1968

NSR 09- 015- 039, " The Procurement . . . Laser Satellite Tracking System," pp. 10, 11, and 14, Sept. 1968.

Deutsch, " Mode Locking Effects in an Internally Modulated Ruby Laser," Applied Physics Letters 7, (4) Aug. 15, 1965, pp. 80- 82.

Schimitschek et al., " Elliptical Head for Liquid Laser Research," Rev. Sci. Instrum. Vol. 35, July, 1964, pp. 911-912.

Harper, " Embedding . . . Materials," Machine Design, June 9, 1966, pp. 150- 173.

AO, " Glass Laser Technology," Laser Focus, Dec. 1967, pp. 21- 29.

Young, " Report on Glass Lasers," Microwaves, Laser Technology Section, July 1968, pp. 69- 78.

Reynolds et al., Freq. Stab. Gas Laser, Final Report, June 17, 1966- Feb. 17, 1967, N67- 20379 May 25, 1967 pp. iii- vi, 28- 34, and 55- 51 and Title pages.

STAR, Vol. 5, No. 9, May 8, 1967, pp. v, vi and 1457.
USGRDR, May 25, 1967, pp. 150- 151.

Primary Examiner—William L. Sikes
Assistant Examiner—R. J. Webster
Attorney—William C. Nealon, Noble S. Williams, Robert J. Bird and Bernard L. Sweeney

[57] ABSTRACT

The composite laser structure is self-aligning and; therefore, individual elements thereof are easily replaceable without contemporaneous adjustment. The method for fabricating and assembling the composite structure is also described.

1 Claim, 41 Drawing Figures

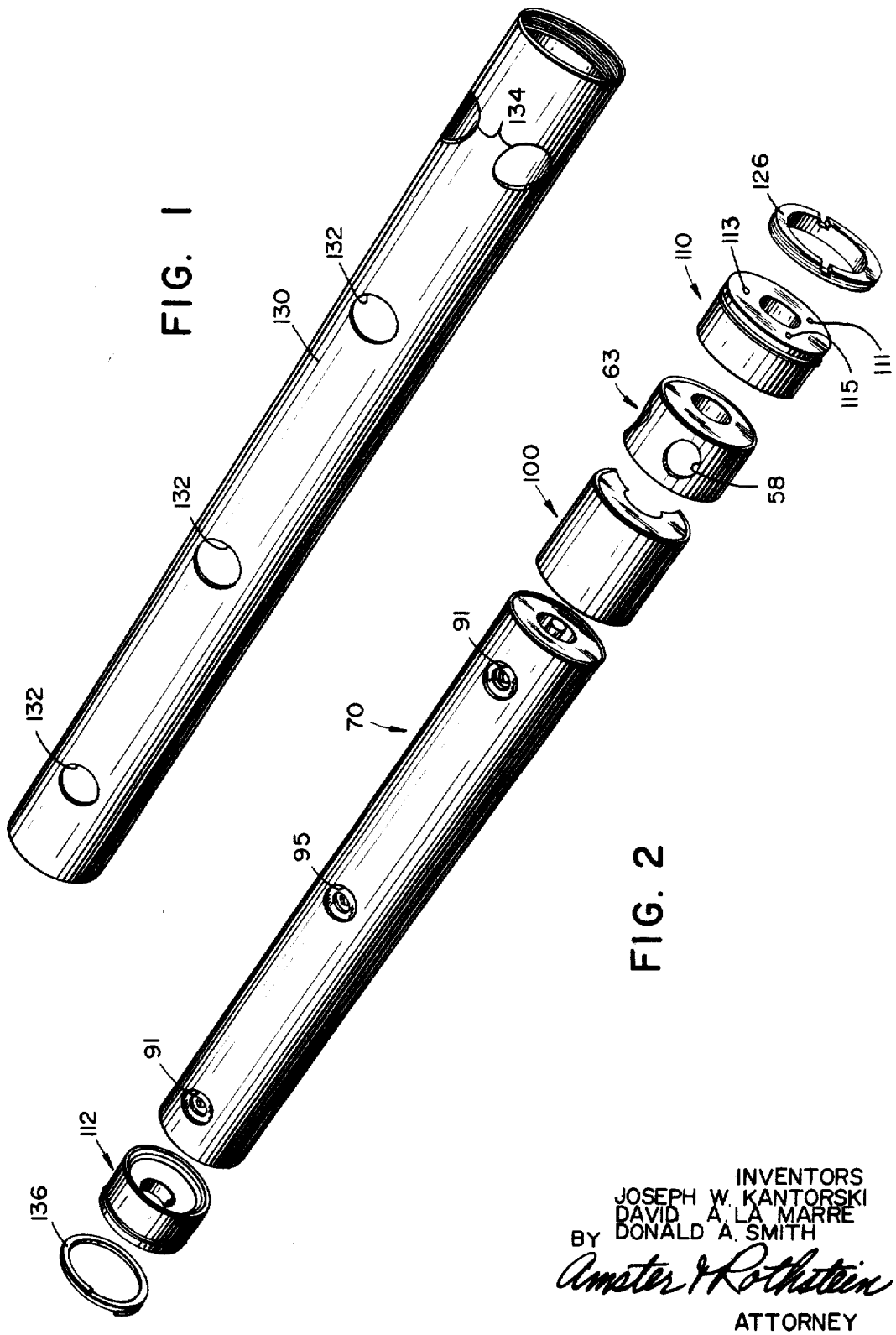

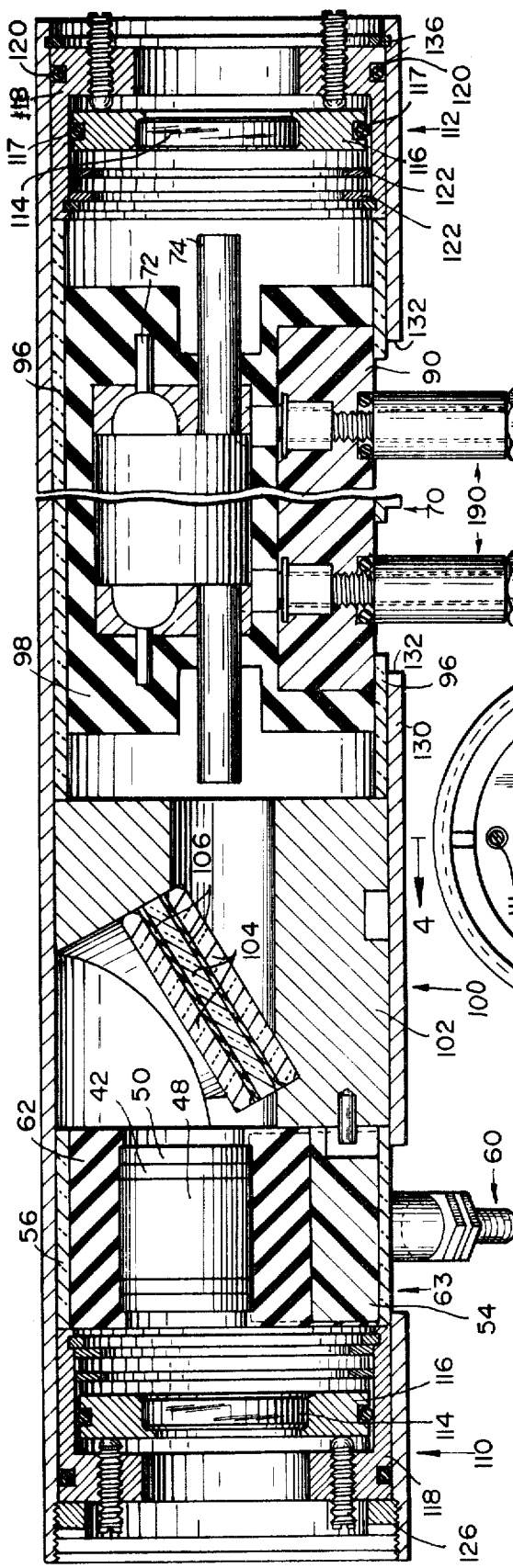
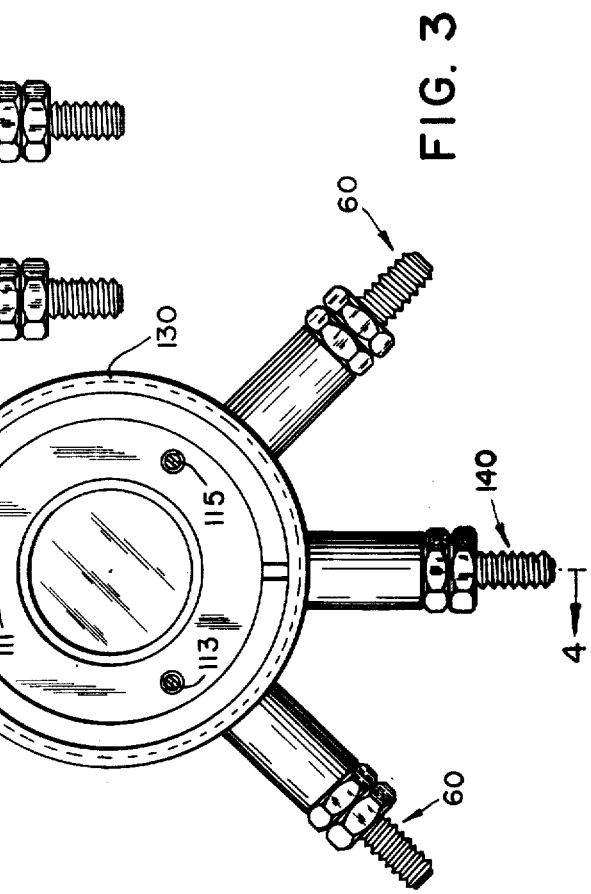
FIG. 4
FIG. 3
INVENTORS
JOSEPH W. KANTORSKI
DAVID A. LA MARRE
DONALD A. SMITH
BY
Amster Rothstein
ATTORNEY

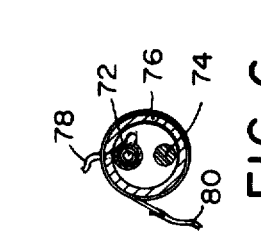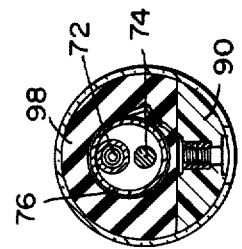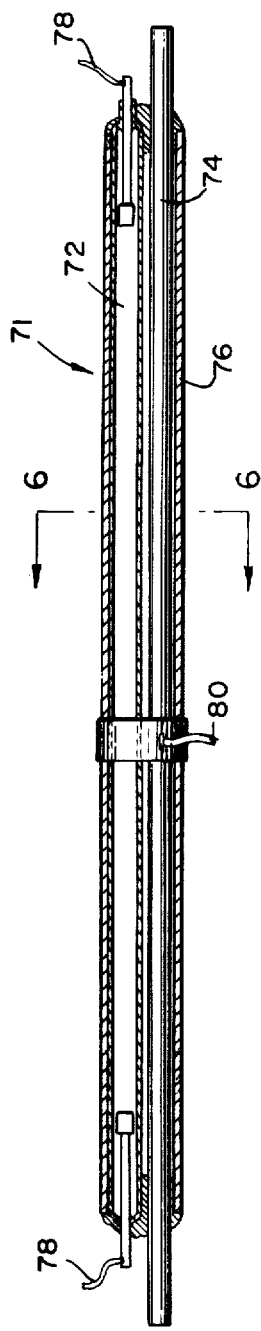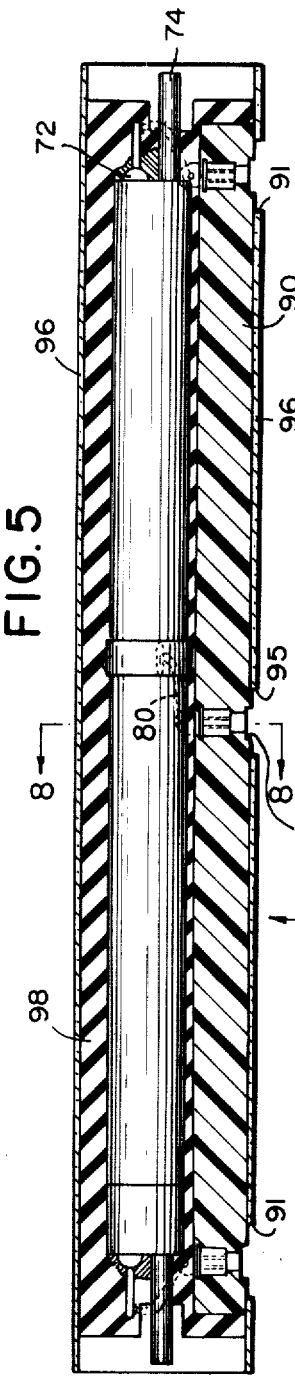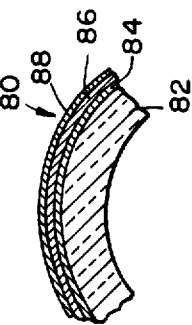

INVENTORS
JOSEPH W. KANTORSKI
DAVID A. LA MARRE
DONALD A. SMITH
BY
*Amster & Rothstein*
ATTORNEY

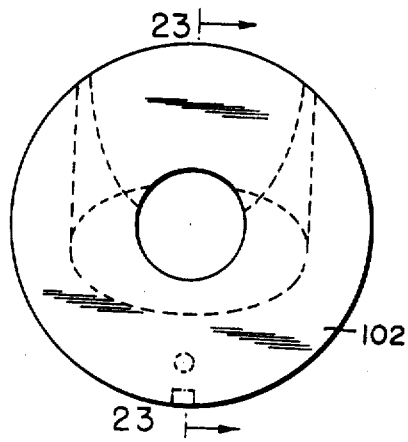
FIG. 22
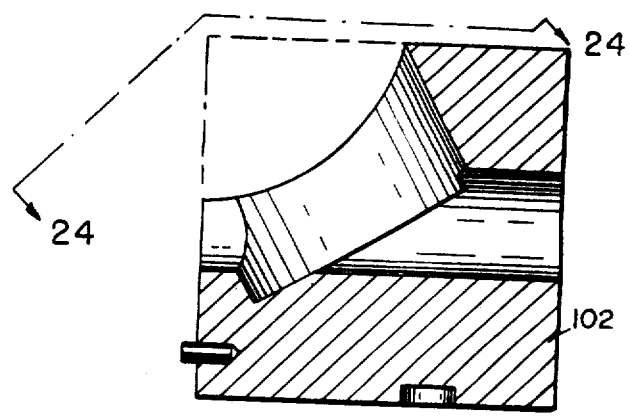
FIG. 23
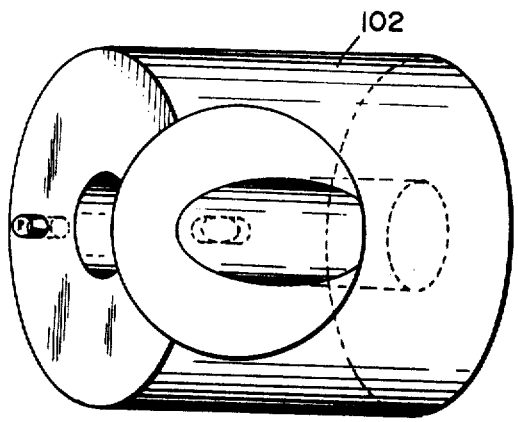
FIG. 24
FIG. 25
FIG. 26
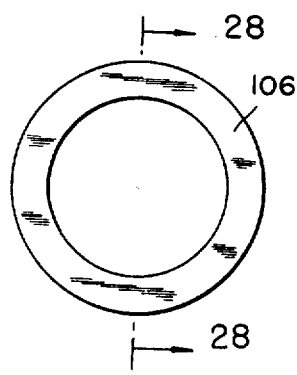
FIG. 27
FIG. 28
INVENTORS
JOSEPH W. KANTORSKI
DAVID A. LA MARRE
DONALD A. SMITH
BY
*Amster & Rothstein*
ATTORNEY

INVENTORS
JOSEPH W. KANTORSKI
DAVID A. LA MARRE
DONALD A. SMITH

BY *Ameter W Rothstein*

ATTORNEY

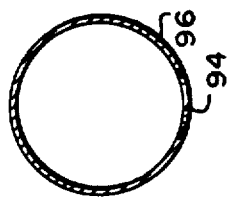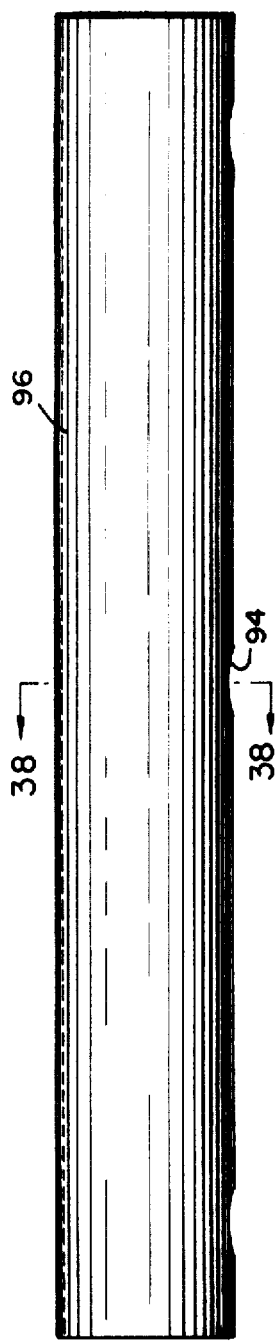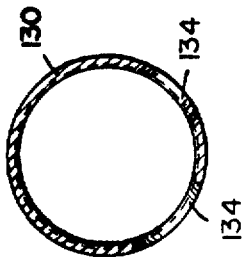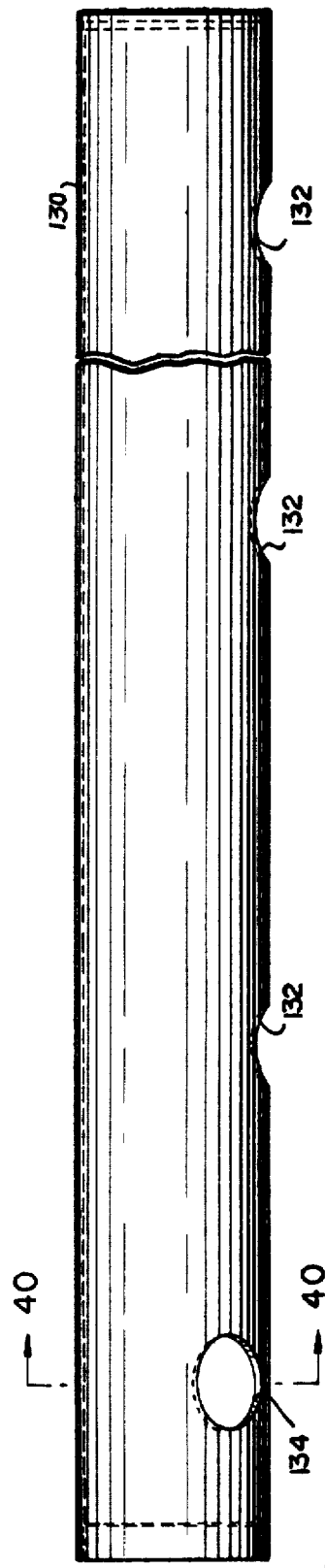

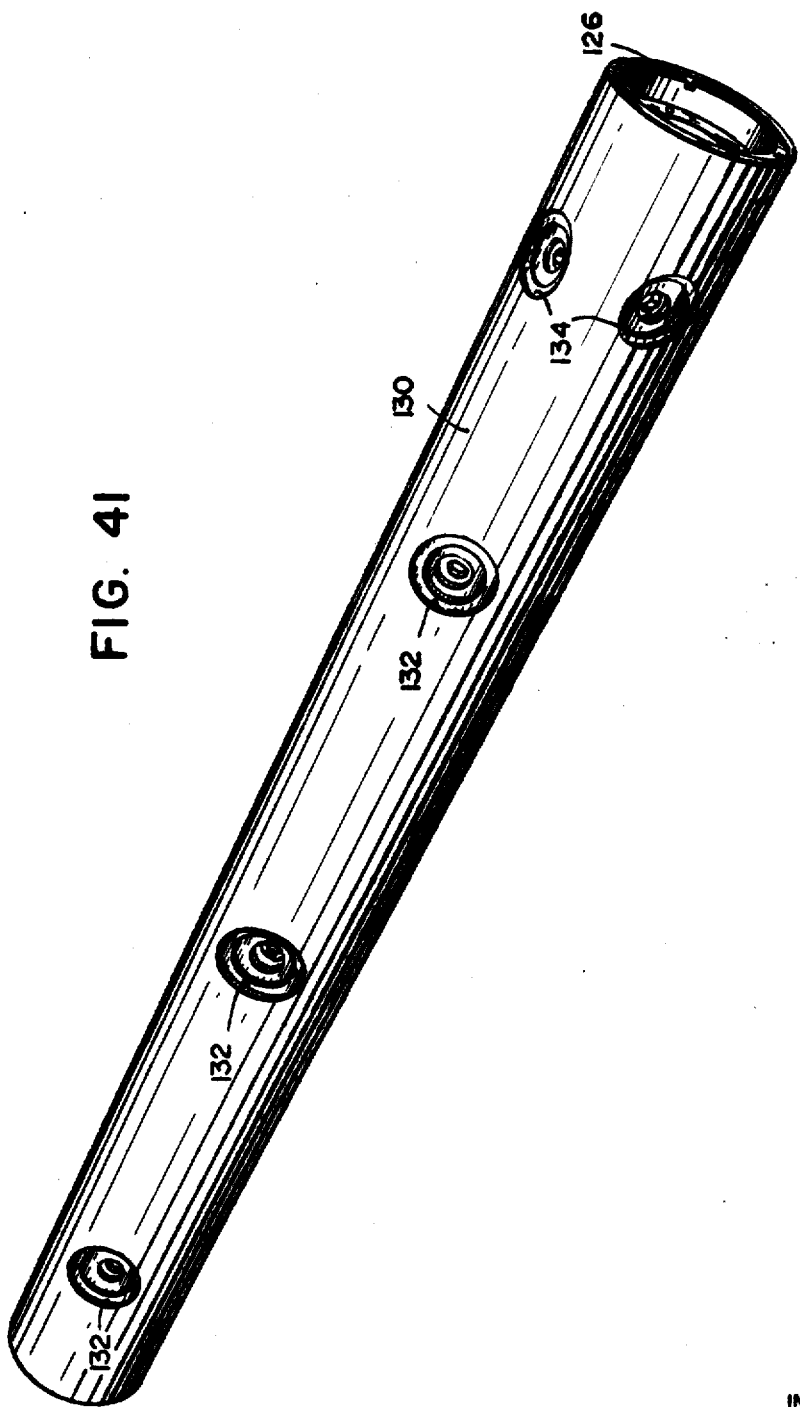

LASER STRUCTURE

FIELD OF THE INVENTION

This invention relates to unitary laser light generating and laser light amplifying assemblies, structures and the like employing laser rods, associated flash tube means and accessories with end mirrors, embodying improvements which enable said structures to be more economically manufactured and more efficiently operated.

PRIOR ART

Laser assemblies which employ elongated laser rods disposed in side-by-side relation to electronic flash tubes or the like so as to be in side pumping relation thereto in an enclosed internally reflective housing are known and used in the laser industry today as described in co-pending U.S. Pat. application Ser. No. 539,041 filed Mar. 31 now abandoned, 1966 for LASER STRUCTURES AND THE LIKE by C.G. Young and similarly assigned to American Optical Corporation. This application has been abandoned in favor of a copending continuation application, Ser. No. 28,199, filed Apr. 14, 1970. These structures direct as much of the available pumping energy as possible from the flash tube into the laser rod during operation thereof. Additionally, the circulation of water or other cooling fluid between and around these laser system parts has been attempted previously to improve the efficiencies of said systems. Such structures, however, experience problems when the unitary laser and flash tube structure is associated with other laser accessories such as end reflectors, electro-optic devices, and polarizing devices. These problems are basically in the area of alignment; furthermore, realignment is necessary each time one of the accessories or parts is replaced.

Furthermore, structures for Pockels cells in present use have experienced problems relating to the moisture-proofing of the hydroscopic crystal. Typical Pockels cell construction may be understood by reference to Robert Goldstein, "Pockels Cell Primer", LASER FOCUS, Feb., 1968, pp. 21-26. It is necessary in such Pockels cell structures that electrodes between the crystals and windows thereof must cover a significant area of the crystal and be transparent for optical applications. In the past, such electrodes have been of wire mesh for high power or evaporated gold rings, which are expensive and delicate since gold has little strength. Furthermore, gold electrodes experience problems with bonding due to the difference of coefficient of thermal expansion between the windows of the Pockels cells, the crystal thereof and the gold of the electrodes. Also electrodes of aluminum, copper, indium or other soft metals have been used, but with little success in overcoming these problems. An excellent moisture seal is extremely important in Pockels cell structure since for most crystals used in such cells the crystal surface would fog if moisture collected thereon.

SUMMARY OF THE INVENTION

Accordingly, a primary object of the present invention is to provide an easily manufactured laser system with replaceable parts that do not require alignment at each replacement.

A further object of the present invention is to provide a method for constructing a unitary laser system and parts thereof comprising a Pockels cell for mode discrimination with electrodes that can withstand high voltage and prevent strain on the crystal of the Pockels cell.

A further and more particular object is to provide a Pockels cell structure which is moisture-tight, inexpensive and rugged for conducting voltage from a source to a Pockels cell crystal.

A still more particular object is to provide a Pockels cell having greater tolerance to temperature variation than was heretofore available with Pockels cells electrodes.

A still further object is to provide a Pockels cell structure including electrodes which provide ease of bonding for the crystal, electrode, and windows to each other in a sealed, moisture-proof arrangement.

These and other objects of the invention are accomplished in one illustrative embodiment wherein a unitary structure for a laser system is provided and includes an outer sleeve with provisions therein for accommodating terminal wires, and an inner sleeve for containing a unitary structure of a laser and flash tube with holes therein for accommodating terminal wires to said flash tube, a polarizer unit, a Pockels cell unit with windows thereon, an output reflector unit, an assembled 100 percent reflector module, and retaining rings for coupling the entire structure together in said outer sleeve. In the laser and flash tube assembly, a potting compound is provided after centering the laser and flash tube to insure proper alignment and spacing of these elements in and with the other components of the system. Also, sealing and potting provisions are made in both the polarizer and Pockels cell for the same reason. An insert sleeve is provided in place of the polarizer and Pockels cell for an alternative embodiment.

A method for assembling the composite laser system described above is provided to insure proper positioning and alignment of the elements of the system. This positioning and aligning is inherently accomplished by the structure of the present invention as will become clear from the more detailed description hereinbelow. This method includes placing the flash lamp and laser inside an internally reflective pump reflector, sealing both ends with a thixotropic sealing compound, fixing the leads to the flash lamp, casting an epoxy terminal board, running the leads from the flash lamp to the terminal board, providing a high voltage trigger lead on the terminal board and fixing it to the flash lamp around the outside of the internal pump reflector, placing the resultant assembly in an inner sleeve, affixing temporary end seals to hold the laser and the flash lamp in position, sealing the terminal holes temporarily, pouring in the potting compound, curing and thereafter taking out the temporary end seals and the terminal seals. The polarizer is provided with three flat plates placed in a tube with cork spacers and the flat plates arranged at Brewsters angle. The polarizer assembly is then sealed with epoxy. The Pockels cell is made by keeping the crystal in dry nitrogen, molding the rubber electrodes for the end faces of the crystal in a teflon mold with the terminal leads cast in, making two windows for the end faces of the crystal with antireflective coating thereon, cementing the electrodes to the windows, cementing the electrode-window assemblies to the crystal with a flexible adhesive, casting a terminal block from epoxy, fastening leads with solder from the electrodes to the terminal block, placing the Pockels cell assembly in an inner sleeve, temporarily sealing the terminal holes in the sleeve, aligning the Pockels cell unit in a fixture which tilts the crystal while holding the sleeve, pouring in a silicone rubber potting compound, curing, removing the cured assembly from the fixture, and thereafter removing the temporary terminal hole seals. The end reflectors are made by cementing the individual reflectors in a holder with O-rings for sealing, potting with epoxy, curing, putting the holder in a housing sealed with an O-ring, aligning, and putting in retaining springs for said reflector modules. The laser-flash tube assembly, polarizer unit, and Pockels cell unit are then placed in a main tube using the steps of inserting a retaining ring in a main tube, then sliding in the output reflector module, sliding in the laser-flash lamp module, sliding in the polarizer unit and then the Pockels cell unit (or in place of the polarizer and Pockels cell, sliding in an insert sleeve), sliding in the 100 percent reflector module and thereafter screwing in another retaining ring to seal the unitary structure in proper alignment.

Other objects, features and advantages of the present invention will be apparent by reference to the following detailed description of a laser structure and its construction with the following drawings, in which:

BRIEF DESCRIPTION OF THE DRAWINGS

FIG. 1 is a pictorial representation of an outer sleeve for retaining the unitary structure of the present invention;

FIG. 2 is a pictorial representation of the parts of the unitary structure for insertion in the outer sleeve of FIG. 1;

FIGS. 3 and 4 are end view and sectional representations of the unitary laser structure according to the present invention in assembled form;

FIGS. 5 and 6 are partially sectional front and end views of the laser and flash tube module with an internal reflector according to the present invention;

FIGS. 7 and 8 are sectional front and end views of the laser and flash tube module and terminal board in an inner sleeve;

FIG. 9 is a partial sectional view of the internal reflector for the laser and flash tube module;

FIGS. 22 and 23 and 24 are end, front sectional and top views of the housing for the polarizer unit for the unitary structure according to the resent invention;

FIGS. 25 and 26 are front and end view representations of a polarizing plate useful in the housing of FIGS. 22 through 24;

FIGS. 27 and 28 are end and front views of the gasket useful in separating the polarizing plates according to FIGS. 25 and 26 in the housing of FIGS. 22 through 24;

FIGS. 37 and 38 are front and end view representations of the inner sleeve for the laser and flash tube module (also shown pictorially in FIG. 2);

FIGS. 39 and 40 are front and sectional end view representations of the outer sleeve for the unitary structure (also shown in FIG. 1 pictorially); and FIG. 41 is a pictorial view of the assembled unitary laser structure according to the present invention.

DETAILED DESCRIPTION OF A PREFERRED EMBODIMENT

Figure 10:
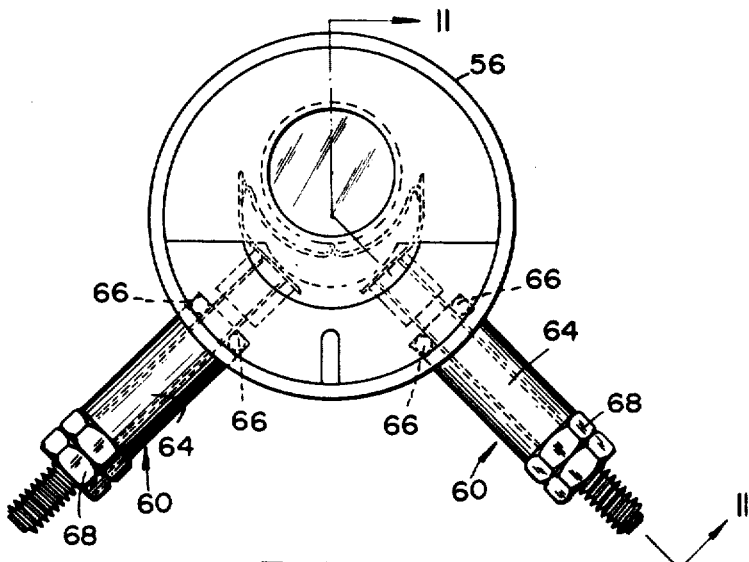
FIG. 10 is an end view representation of the Pockels cell unit of the present invention.

The present invention deals with a compact, durable, prealigned laser structure formed of modular units in an outer aligning sleeve. These units include a laser unit, a polarizer unit, a Pockels cell unit, and a pair of end reflector units. These units will be described both separately and compositely hereinbelow.

The use of Pockels cells is becoming increasingly important, particularly in optical test instrumentation for electronically-variable retarders and light choppers. Furthermore, the modulation of light has become increasingly important in laser applications. Pockels cells produce a phase change in polarized light passing through certain uniaxial crystal materials under the influence of an electric field. The effect is a linear function of the voltage which is applied parallel to the crystal optical axis in the same direction as the incident light.

In order to apply the voltage to the Pockels cell crystal, it is necessary that the Pockels cell comprise electrodes for the two faces 44,46 of the crystal 48 (see FIGS. 10 through 21) to cover a significant area of the faces. The crystal 48 may be any of a number of crystal materials available for use in such systems. For instance, ammonium dihydrogen phosphate, potassium dideuterium phosphate or potassium dihydrogen phosphate are particularly useful in the Pockels cell arrangement. The choice between the available materials is usually made on the basis of application. Ammonium dihydrogen phosphate (ADP) has been largely replaced by potassium dihydrogen phosphate (KDP) which has a lower half-wave voltage. One disadvantage of ADP is that it has a higher piezoelectric constant than does KDP. The value is high enough in ADP to generate ringing oscillations in the transmitted light beam when the crystal is excited by a pulse of voltage. This effect is not evident in the same modulator structures when the other two mentioned materials are used. If the lowest possible range of operating voltages is necessary, potassium dideuterium phosphate (KD*P) should be specified. The reduction in voltage requirements for a given retardation is more than 50 per cent as compared to KDP. The theoretical variation of half-wave voltage as a function of wave length for KDP and KD*P show that KD*P has the added advantage of being usable at wave lengths approaching 2 microns.

Usually the electrodes for applying voltage to the crystal faces are either soft metal or soft metal oxides bonded onto the crystals. To protect the assembly, optical windows of glass or quartz are then laminated over the electrodes thus sealing the aperture area from moisture damage. However, as mentioned previously, bonding difficulties are usually experienced due to the difference in coefficient of thermal expansion with the windows, the crystal and the electrode material.

According to the present invention, it is recommended that the electrodes 42 be formed of conducting elastomer silicone rubber loaded with silver coated particles. That material is resilient enough to contract to move with the glass of the windows 50 and the crystal 48. Also, such a material has more tolerance to temperature variation than do any of the previously used electrode materials. Furthermore, it conducts well and is inexpensive. The electrodes 42 are molded in a teflon mold with the terminal leads 52 cast in. The windows 50 are made with an anti-reflective coating and the molded electrodes 42 are then cemented to the windows. The entire Pockels cell assembly (shown in FIGS. 10 and 11) is fabricated with the crystal 48 in dry nitrogen to keep it from collecting moisture during the manufacturing processes. A flexible adhesive is applied while the crystal is still in dry nitrogen to cement the electrode-window assemblies to the crystal 48. A terminal block 54 is cast from epoxy through which terminal leads are passed to the electrodes 42.

The crystal 48 — electrode 42 — window 50 assembly is then placed in an inner sleeve 56 having holes 58 therein for receiving the terminal post units 60. The terminal holes 58 are selected temporarily and the assembly including the terminal block 54 is aligned in a fixture which tilts the crystal while holding the inner sleeve 56. A potting compound 62 is then used for potting the assembly and allowed to cure. The assembly is then removed from the fixture and the temporary terminal hole seals removed to complete the fabrication of unit 63, the Pockels cell unit (see FIGS. 2 and 4).

Figure 11:
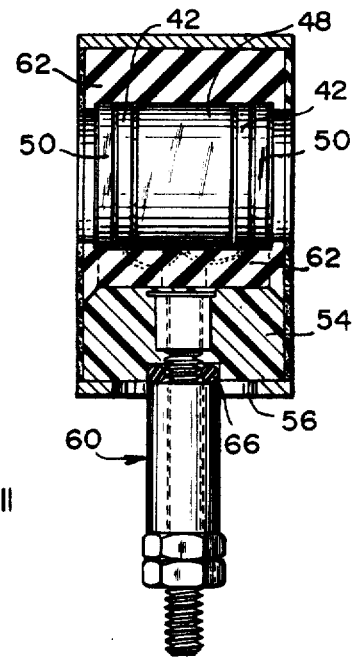
FIG. 11 is a sectional representation of the Pockels cell unit taken along line 11—11 of FIG. 10.
Figure 12:
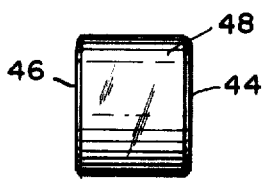
FIGS. 12 and 13 are front and end view representations of the crystal of the Pockels cell unit.
Figure 13:
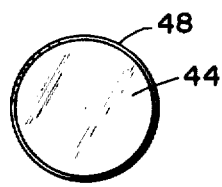
Figure 14:
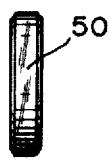
FIGS. 14 and 15 are front and end view representations of a window for the Pockels cell unit.
Figure 15:
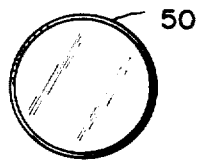
Figure 16:
FIGS. 16 and 17 are front and sectional view representations of an electrode for the Pockels cell assembly.
Figure 17:
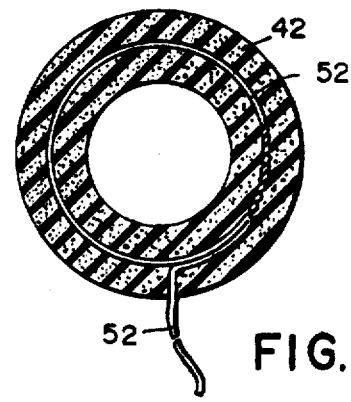
Figure 18:
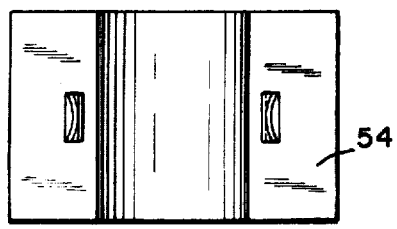
FIGS. 18 and 19 are top and sectional view representations of the terminal board for the Pockels cell unit.
Figure 19:
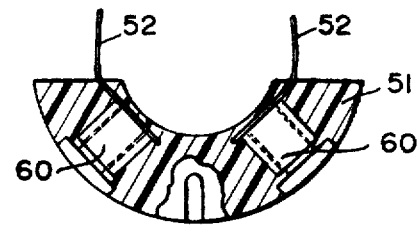
Figure 20:
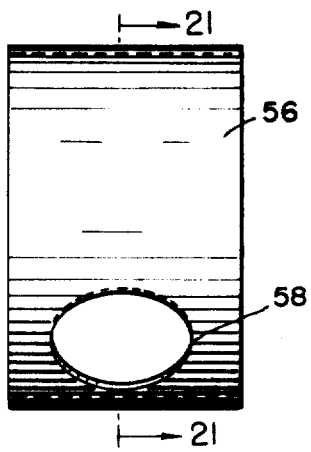
FIGS. 20 and 21 are front and end sectional view representations of the inner sleeve for the Pockels cell unit according to the present invention.
Figure 21:
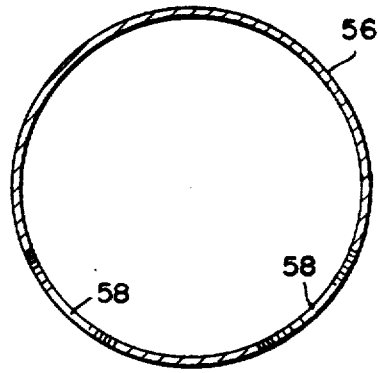
Figure 29:
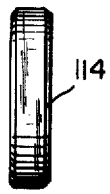
FIGS. 29 and 30 are front and end view representations of an output reflector for the unitary structure of the present invention.
Figure 30:
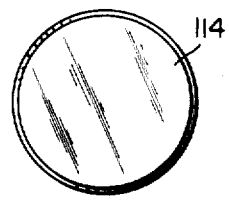
Figure 31:
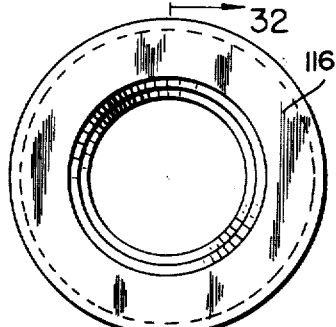
FIGS. 31 and 32 are end and front view representations of holders for the output reflectors according to FIGS. 29 and 30.
Figure 32:
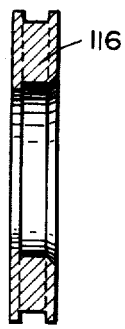
Figure 33:
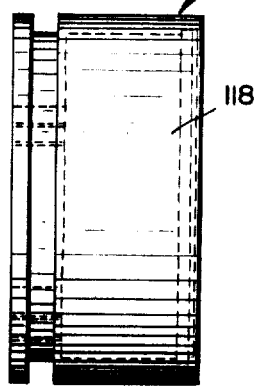
FIGS. 33 and 34 are front and end view representations of a housing for the holders according to FIGS. 31 and 32.
Figure 34:
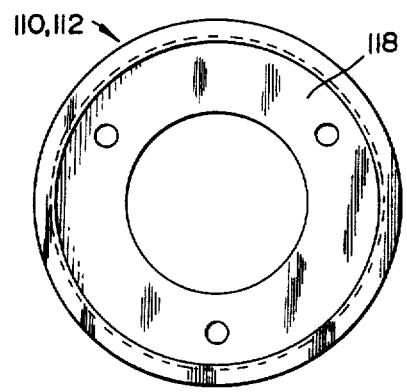

The other features of the fabricated Pockels cell unit may be seen by reference to FIGS. 10 and 11. For instance, phenolic spacers 64 are used on the terminal posts 60 and sealing is accomplished by O-rings 66. Hex nuts 68 are used to hold the terminal post assemblies 60 together.

The laser unit 70 is shown in FIGS. 5 through 9 as comprising a laser cavity assembly 71 which includes flash tube 72, laser rod 74 and internally reflective pump reflector 76. The flash tube has terminal leads 78 extending therefrom to a suitable power source. Also, a high voltage (20 KV) trigger lead 80 is wrapped around the outside of the pump reflector 76. In more detail, the internally reflective pump reflector 76 is shown in FIG. 9 to include a heat resistant glass 82 as a base, a chemically plated silver layer 84 surrounds that base glass, an electroplated copper layer 86 over the silver layer, and black paint 88 over the copper layer as the outside material. The laser module is fabricated by placing the flash lamp 72 and the laser rod 74 inside the pump reflector 76, sealing both ends with a thixotropic sealing compound which is flexible to accommodate the difference in thermal expansion coefficient for the three glass elements — flash tube 72, laser rod 74 and internally reflective pump reflector 76. Even though the elements are all formed of glass, they generally have a different thermal expansion coefficient, thus requiring the flexible sealing compound. The leads 78 are attached to the flash lamp 72, and an epoxy terminal board 90 is molded to accommodate the leads from the flash lamp through holes 91 in the terminal board 90. The high voltage trigger lead 80 is placed through an appropriate hole 94 in the terminal board 90 and wrapped around the outside of the pump reflector 76. The laser-flash tube-reflector assembly is then placed with the terminal board 90 in inner sleeve 96 and temporary end seals (not shown) are placed in position to hold the laser and flash lamp in proper alignment with relation to the inner sleeve 96. The terminal holes 91 and 95 are also sealed temporarily and a potting compound 98 poured into the unit. The potting compound may be a low viscosity material such as room temperature vulcanizing silicone rubber, flexible epoxy, or polysulfide rubber. After curing, the temporary end seals and temporary terminal hole seals are removed.

The polarizing unit 100 is shown in FIGS. 22 through 28 as comprising a housing 102 for holding polarizing plates 104 at Brewster's angle with spacers 106, usually of cork, for providing spacing support between the polarizing plates 104.

The end reflector units 110 and 112 are shown in FIGS. 29 through 34 as comprising a reflector 114 for cementing in reflector holder 116, having O-rings 117 by potting with epoxy (see FIG. 4). The holders 116 are then placed in the reflector housing 118, which is sealed with O-rings 120. The reflector holder 116 is then aligned in the housing 118 with springs 122 in position to hold that alignment.

Figure 35:
FIGS. 35 and 36 are front and end view representations of the threaded lock nut useful in retaining the unitary structure according to the present invention.
Figure 36:
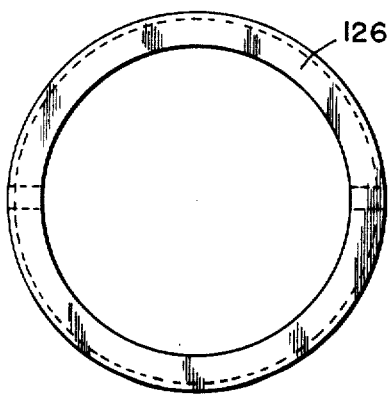

The lock nut 126 for holding the unit together at one end is shown in FIGS. 35 and 36 and in position in FIGS. 2 and 4.

All elements of the system are placed in outer aligning sleeve 130 (see the pictorial drawing of FIG. 1 and FIGS. 39 and 40) having holes 132 for accommodating the terminal leads to the laser modular and holes 134 for accommodating the terminal leads to the Pockels cell unit. The inner sleeve 96 of the laser unit 70 is shown in FIGS. 37 and 38.

The complete unit is now ready for final assembly. With a retaining ring 136 in position at one end (the right end, as an example) of the assembly drawing of FIG. 4 and the left end of the parts view of FIG. 2, the partially transmissive output reflector unit 112 is placed in position in the outer sleeve 130. The laser assembly 70 is then put in its position in the outer sleeve followed by the polarizer unit 100. The Pockels cell unit 63 is then inserted followed by the 100 percent reflector unit 110. The entire assembly is then positioned by the threaded lock nut 126 and reflectors 110 and 112 finally aligned by screws 111, 113, 115. It is possible, of course, to replace the polarizer unit 100 and the Pockels cell unit 63 by an insert sleeve (not shown) in order to obtain a long-pulse laser. The terminal posts 140 and 60 (FIG. 3) are then inserted through appropriate receiving holes for final connection of both the Pockels cell unit and the laser unit to suitable power sources. The assembly of the parts of FIG. 2 into the outer sleeve 130 of FIG. 1 appears pictorially in FIG. 41.

Reviewing the process by steps, the laser module is fabricated by placing the flash lamp 72 and the laser 74 inside the pump reflector 76. Both end of the pump reflector are then sealed with a thixotropic sealing compound and terminal leads are fixed to the flash lamp. An epoxy terminal board 90 is fabricated and the terminal leads affixed thereto. The high voltage trigger terminal lead 80 is fixed to the terminal board 90 and the flash lamp 72 around the outside of the pump reflector 76. The foregoing assembly including the terminal board 90 is then placed in an inner sleeve 96 to which is applied temporary end and terminal hole seals. The potting compound is poured in and cured and the temporary seals removed.

The Pockels cell is fabricated while keeping the crystal 48 in dry nitrogen and the process is begun by molding rubber electrodes in a teflon mold with terminal leads cast in. The two windows 50 for the Pockels cell are fabricated with antireflective coating on both of the faces. The electrodes 42 are cemented to the windows 50 and in dry nitrogen the electrode-window assemblies are cemented to the crystal 48 with a flexible adhesive. The terminal block 54 is cast from epoxy and the leads fastened with solder from the electrodes 42 to the terminal block 54. The assembly is then placed into an inner sleeve 56 and the terminal holes sealed. The unit is aligned in a fixture and silicone rubber potting compound poured in and cured. The unit is removed from the fixture and the temporary terminal hole seals removed.

The polarizer is fabricated with three flat plates 104 placed in a housing 102 with cork spacers 106 at Brewster's angle. The unit is then sealed with epoxy.

The end reflectors are made by placing the reflectors in holders 116 having O-rings for sealing and the reflectors cemented with epoxy. The holders are then placed in housings and sealed with O-rings. The assembly is then aligned with springs 122. All of the units are then placed in the main tube or outer sleeve as previously described.

The composite laser unit as described herein is particularly useful in Q-switching applications with the laser 70 propagating light through the polarizer 100, which discriminates against one direction of plane polarized light components and passes the other direction. The one direct of polarization that is passed by the polarizer 100 is incident to the Pockels cell 63, retarded 45° and thereby converted to circularly polarized light. Upon reflection from the end reflector 110, this light passes through the Pockels cell in the reverse direction and is thereby retarded 45° more to become plane polarized in a direction discriminated against by the polarizer 100 in the forward pass. Therefore, light comes back to the laser 70 which is insufficient for oscillation and output of the system is prevented. By shutting off the voltage applied to the Pockels cell 63, such action would not occur and the output would be enabled.

What is claimed is:

1. The compact, durable, prealigned laser structure comprising
 a laser unit which is comprised of an elongated glass laser rod having an
 axis extending lengthwise therethrough,
 a flash-lamp disposed generally parallel to the laser rod axis,
 a cylindrical pumping reflector disposed around substantially the entire length of the laser rod and flash-lamp,
 electrically insulating means for supporting the laser rod and flash-lamp within the cylindrical pumping reflector,
 means disposed around the cylindrical pumping reflector for triggering the flash-lamp, and
 a tubular sleeve having an axis extending therethrough in which the cylindrical pumping reflector if firmly mounted by means of an electrically insulating potting compound, the axis of the laser rod being prealigned in an substantially parallel relation to the axis of the tubular sleeve,
 first and second end reflector units having reflectors therein which are reflective at the emission wavelength of the glass laser rod, at least one reflector of which is slightly transmissive at the emission wave length,
 means associated with each of the reflector units for adjusting the orientation of the reflectors about a central axis said means including a spring disposed around the reflector on the side thereof adjacent the laser rod and at least three circumferentially disposed adjusting screws bearing on the reflector on the side opposite the laser rod, and a tubular outer aligning sleeve for mounting the laser unit between the first and second end reflector units, each of the units having a sliding fit within the outer aligning sleeve whereby the entire laser structure is aligned.

* * * * *